(12) United States Patent
Wood (10) Patent No.: US 10,547,537 B1
(45) Date of Patent: Jan. 28, 2020

(54) BATCHED PATH COMPUTATION IN RESOURCE-CONSTRAINED NETWORKS

(71) Applicant: Juniper Networks, Inc., Sunnyvale, CA (US)

(72) Inventor: David C. Wood, Woodbridge (GB)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 15/785,220

(22) Filed: Oct. 16, 2017

Related U.S. Application Data (63) Continuation of application No. 14/500,736, filed on Sep. 29, 2014, now Pat. No. 9,794,165.

(51) Int. Cl.
*H04L 12/729* (2013.01)
*H04L 12/723* (2013.01)

(52) U.S. Cl.
CPC .......... *H04L 45/125* (2013.01); *H04L 45/507* (2013.01)

(58) Field of Classification Search
CPC ............................ H04L 45/125; H04L 45/507
See application file for complete search history.

(56) References Cited

U.S. PATENT DOCUMENTS

| | | | |
|---|---|---|---|
| 7,319,700 B1 | 1/2008 | Kompella | |
| 7,346,056 B2 | 3/2008 | Devi | |
| 7,411,964 B2 | 8/2008 | Suemura | |
| 7,443,832 B2 | 10/2008 | Randriamasy et al. | |
| 7,451,340 B2 | 11/2008 | Doshi et al. | |
| 7,474,620 B2 | 1/2009 | Kline et al. | |
| 7,903,584 B2 | 3/2011 | Vasseur et al. | |
| 7,990,877 B2 | 8/2011 | Lu | |
| 8,014,291 B2 | 9/2011 | Vasseur et al. | |
| 8,369,213 B2 | 2/2013 | Vasseur et al. | |
| 8,416,776 B2 * | 4/2013 | Lim | H04L 12/185 370/390 |

(Continued)

FOREIGN PATENT DOCUMENTS

WO 2013184846 A1 12/2013

OTHER PUBLICATIONS

Farrel, A. et al. "A Path Computation Element (PCE)-Based Architecture" Network Working Group RFC 4655, Aug. 2006, pp. 1-39. (Year: 2006).*

(Continued)

*Primary Examiner* — Khaled M Kassim
*Assistant Examiner* — Thomas R Cairns
(74) *Attorney, Agent, or Firm* — Shumaker & Sieffert, P.A.

(57) ABSTRACT

In some examples, a controller for a network includes a path computation module that determines, for a plurality of LSPs or other flows having a common source, shortest paths of the network from the common source to respective destinations of the plurality of LSPs based at least on a minimum bandwidth. The path computation module further determines, after determining the shortest paths, a shortest path for the LSP of the plurality of LSPs as the shortest path of the shortest paths of the network from the common source to a destination for the LSP. A path provisioning module of the controller, after the path computation module determines the shortest path for the LSP and in response to the path computation modules routing the LSP to the shortest path for the LSP on a network model of the network, installs the LSP to the network as routed to the shortest path.

20 Claims, 7 Drawing Sheets

(56) References Cited

U.S. PATENT DOCUMENTS

| | | |
|---|---|---|
| 9,794,165 B1 | 10/2017 | Wood |
| 2004/0233850 A1 | 11/2004 | Randriamasy et al. |
| 2015/0244617 A1 | 8/2015 | Nakil et al. |
| 2015/0295820 A1* | 10/2015 | Tang ..................... H04L 45/50 370/351 |

OTHER PUBLICATIONS

"Pentium Dual-Core" Wikipedia, retrieved via Archive.org—Wayback Machine, https://web.archive.org/web/20130513204813/https://en.wikipedia.org/wiki/Pentium_Dual-Core, captured May 13, 2013, pp. 1-4 (Year: 2013).*

Andersson et al., "LDP Specification," Network Working Group, RFC 3036, Jan. 2001, 132 pp.

Prosecution History from U.S. Appl. No. 14/500,736, filed Feb. 3, 2016 through Jun. 15, 2017, 144 pp.

* cited by examiner

BATCHED PATH COMPUTATION IN RESOURCE-CONSTRAINED NETWORKS

This application is a continuation of U.S. patent application Ser. No. 14/500,736, filed Sep. 29, 2014, the entire contents of which being incorporated herein by reference.

TECHNICAL FIELD

The invention relates to computer networks and, more specifically, to path computation of computer network paths.

BACKGROUND

Routing devices within a network, often referred to as routers, maintain tables of routing information that describe available routes through the network. Network routers maintain routing information that describes available routes through the network. Upon receiving a packet, a router examines information within the packet and forwards the packet in accordance with the routing information. In order to maintain an accurate representation of the network, routers exchange routing information in accordance with one or more routing protocols, such as an interior gateway protocol (IGP) or Border Gateway Protocol (BGP).

The term "link" is often used to refer to the connection between two devices on a network. The link may be a physical connection such as a copper wire, a coaxial cable, any of a host of different fiber optic lines or a wireless connection. In addition, network devices may define "virtual" or "logical" links, and map the virtual links to the physical links. In other words, the use of virtual links provides a degree of abstraction. As networks grow in size and complexity, the traffic on any given link may approach a maximum bandwidth capacity for the link, thereby leading to congestion and loss.

Multi-protocol Label Switching (MPLS) is a mechanism used to engineer traffic patterns within Internet Protocol (IP) networks. Using MPLS, a source device can request a path through a network, i.e., a Label Switched Path (LSP). An LSP defines a distinct path through the network to carry packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

Traffic engineering may be applied within a network for a variety of purposes, such as to route traffic around network failures or congested links or to direct certain traffic along a particular path through the network that meets a set of explicit requirements. Historically, MPLS label distribution was driven by protocols such as label distribution protocol (LDP), Resource Reservation Protocol with Traffic Engineering extensions (RSVP-TE) and labeled Border Gateway Protocol (LBGP). Procedures for LDP by which label switching routers (LSRs) distribute labels to support MPLS forwarding along normally routed paths are described in L. Anderson, "LDP Specification," RFC 3036, Internet Engineering Task Force (IETF), January 2001, the entire contents of which are incorporated by reference herein. RSVP-TE uses constraint information, such as bandwidth availability, to compute and establish LSPs within a resource-constrained network. RSVP-TE may use bandwidth availability information accumulated by a link-state interior routing protocol, such as the Intermediate System-Intermediate System (IS-IS) protocol or the Open Shortest Path First (OSPF) protocol, extended to carry traffic engineering information.

Head-end routers of an LSP are commonly known as ingress routers, while routers at the tail-end of the LSP are commonly known as egress routers. Ingress and egress routers, as well as intermediate routers along the LSP that support MPLS, are referred to generically as label switching routers (LSRs). A set of packets to be forwarded along the LSP is referred to as a forwarding equivalence class (FEC). A plurality of FECs may exist for each LSP, but there may be only one active LSP for any given FEC. A FEC definition typically includes the IP address of the destination of the LSP, e.g., an IP address assigned to the egress router of the LSP. The ingress label edge router (LER) uses routing information, propagated from the egress LER, to determine the LSP, to assign labels for the LSP, and to affix a label to each packet of the FEC. The LSRs use MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR or LER. The egress LER removes the label from the packet and forwards the packet to its destination in accordance with non-label based packet forwarding techniques.

In general, each router along the LSP maintains a context that associates a FEC with an incoming label and an outgoing label. In this manner, when an LSR receives a labeled packet, the LSR may swap the label (i.e., the incoming label) with the outgoing label by performing a lookup in the context. The LSR may then forward the packet to the next LSR or LER along the LSP. The next router along the LSP is commonly referred to as a downstream router or a next hop.

In other words, once a packet is mapped on to an LSP by an LER, the LSRs along the LSP forward the packet based on labels attached to the packet rather than making independent forwarding decisions based on the packet destination and the LSRs' routing information. A Traffic Engineering MPLS LSP (TE LSP) may in this way be used to define and implement a path from a source device to a destination device that satisfies requirements for certain traffic transported by the network.

The explicit requirements that must be satisfied by an LSP represent constraints upon the set of possible paths from the source device to the destination device. These constraints, such as available bandwidth and link attributes/coloring, direct the path computation device executing shortest path first algorithms to compute a satisfactory path for the single LSP with regard to the constraint metrics. The network routers then establish an LSP that matches the computed path and, using the LSP, forward traffic in a manner that satisfies the constraints. The path computation device may then compute a satisfactory path for another LSP, and then another, and so on until the path computation device is unable to pack any additional LSP into the network. Constrained shortest-path first (CSPF) thus represents a fundamental building block for traffic engineering systems, including MPLS and Generalized MPLS (GMPLS) networks. Moreover, as constraint-based path computation proceeds for multiple LSPs, when each LSP is successively loaded on the network, the available bandwidth is reduced. As a result, constraint-based path computation in large networks is a complex, time- and resource-consuming operation.

SUMMARY

In general, techniques are described for accelerating available path computation and selection for paths. In some examples, a path computation device computes shortest paths for a set of label-switched paths (LSPs) having respective bandwidth requirements and all headed by a particular source (i.e., each LSP of the set of LSPs has the same head-end device). Specifically, the path computation device may first determine the list of all destinations for the set of LSPs headed by the source and compute suitable, respective paths from the source to each destination in the list of destinations.

In some examples, the path computation device determines the minimum bandwidth requirement for the whole set of LSPs and removes, from the network graph, network links that do not support the minimum bandwidth. Because the time to compute the shortest paths to multiple destinations of the set of LSPs is similar to the time taken to compute the path to the furthest destination of this set, executing a shortest-path first (SPF) algorithm on the pruned network graph to determine paths to multiple destinations (rather than executing the SPF algorithm once for each destination for the set of LSPs) may reduce the overall time taken by the path computation device to compute suitable, respective paths from the source to each destination in the list of destinations. This reduction is of the order of the number of destinations processed in the batch calculation; hence in a large network with many nodes, the potential computation savings may be significant. Moreover, by pruning the network graph of network links unable to support the minimum bandwidth, the techniques may employ a non-constrained SPF algorithm that is able to avoid checking (e.g., in the inner-most loop) that each network link in the pruned network graph meets the minimum bandwidth constraint, thereby improving efficiency of the path computation algorithm in some instances.

In some examples, the path computation device determines the minimum bandwidth requirement for the set of LSPs (having a common source) and uses the minimum bandwidth as a constraint for performing a constrained SPF (CSPF) algorithm on the network graph. The minimum bandwidth is thus a common minimum bandwidth for all of the LSPs and, as a result, path computation device may determine paths to multiple destinations rather than executing the CSPF algorithm once for each destination for the set of LSPs, which may reduce the overall time taken by the path computation device to compute suitable, respective paths from the source to each destination in the list of destinations. As noted above, computing the shortest paths to multiple destinations of the set of LSPs is similar to the time taken to compute the path to the furthest destination of this set, with a computational reduction on the order of the number of destinations processed in the batch calculation.

Having computed suitable paths for each LSP of the set of LSPs, the path computation device attempts to route each LSP in the set of LSPs on the path computed from the LSP source to the LSP destination, if any, while accounting for the required bandwidth for the LSP and the remaining bandwidth capacity on the links of the path. If there are LSPs that cannot be routed in this iteration, they are added a set of LSPs to route again. A new "minimum bandwidth" is computed for this new (reduced) set of LSP to route again; and the batch SPF or CSPF calculation is repeated for the set of LSPs to route again. In this way, the path computation device may route a batch of multiple LSPs on a single run of the SPF/CSPF algorithm based on the minimum bandwidth of this set. For the method described here, the list of LSPs to route reduces with each iteration, and the algorithm therefore avoids an infinite loop. At least in some cases, specifically in networks with many nodes and the list of LSPs to route is large, the path computation device may in this way reduce at least one of the time complexity, computational complexity, and time taken to route multiple LSPs on an MPLS network, as well as improve packing of the LSPs in the MPLS network in some cases. While described above and elsewhere in this disclosure with respect to LSPs, the techniques described in this disclosure may be applicable to other flow types with different types of interface switching, such as Lambda-based and time-division multiplexing (TDM)-based.

In one example, a method comprises determining, by a controller of a network and for a plurality of label-switched paths (LSPs) having a common source, shortest paths of the network from the common source to respective destinations of the plurality of LSPs based at least on a minimum bandwidth, the minimum bandwidth comprising an amount of bandwidth required for an LSP of the plurality of LSPs that has the lowest bandwidth required from among the plurality of LSPs. The method also comprises determining, by the controller after determining the shortest paths, a shortest path for the LSP of the plurality of LSPs as the shortest path of the shortest paths of the network from the common source to a destination for the LSP. The method also comprises, by the controller, after determining the shortest path for the LSP and in response to routing the LSP to the shortest path for the LSP on a network model of the network, installing the LSP to the network as routed to the shortest path.

In another example, a method comprises determining, by a controller of a network and for a plurality of flows having a common source, shortest paths of the network from the common source to respective destinations of the plurality of flows based at least on a minimum bandwidth, the minimum bandwidth comprising an amount of bandwidth required for a flow of the plurality of flows that has the lowest bandwidth required from among the plurality of flows. The method also comprises determining, by the controller after determining the shortest paths, a shortest path for the flow of the plurality of flows as the shortest path of the shortest paths of the network from the common source to a destination for the flow. The method also comprises by the controller, after determining the shortest path for the flow and in response to routing the flow to the shortest path for the flow on a network model of the network, installing the flow to the network as routed to the shortest path.

In another example, a controller for a network comprises one or more processors coupled to a memory and a path computation module configured for execution by the one or more processors to determine, for a plurality of label-switched paths (LSPs) having a common source, shortest paths of the network from the common source to respective destinations of the plurality of LSPs based at least on a minimum bandwidth, the minimum bandwidth comprising an amount of bandwidth required for an LSP of the plurality of LSPs that has the lowest bandwidth required from among the plurality of LSPs, wherein the path computation module is further configured for execution by the one or more processors to determine, after determining the shortest paths, a shortest path for the LSP of the plurality of LSPs as the shortest path of the shortest paths of the network from the common source to a destination for the LSP. The controller also comprises a path provisioning module configured for execution by the one or more processors to, after the path computation module determines the shortest path for the LSP and in response to the path computation modules routing the LSP to the shortest path for the LSP on a network model of the network, installs the LSP to the network as routed to the shortest path.

In another example, a non-transitory computer-readable medium contains instructions for causing one or more programmable processors of a controller of a network to determine, for a plurality of flows having a common source, shortest paths of the network from the common source to respective destinations of the plurality of flows based at least on a minimum bandwidth, the minimum bandwidth comprising an amount of bandwidth required for a flow of the plurality of flows that has the lowest bandwidth required from among the plurality of flows; determine, after determining the shortest paths, a shortest path for the flow of the plurality of flows as the shortest path of the shortest paths of the network from the common source to a destination for the flow; and after determining the shortest path for the flow and in response to routing the flow to the shortest path for the flow on a network model of the network, install the flow to the network as routed to the shortest path.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
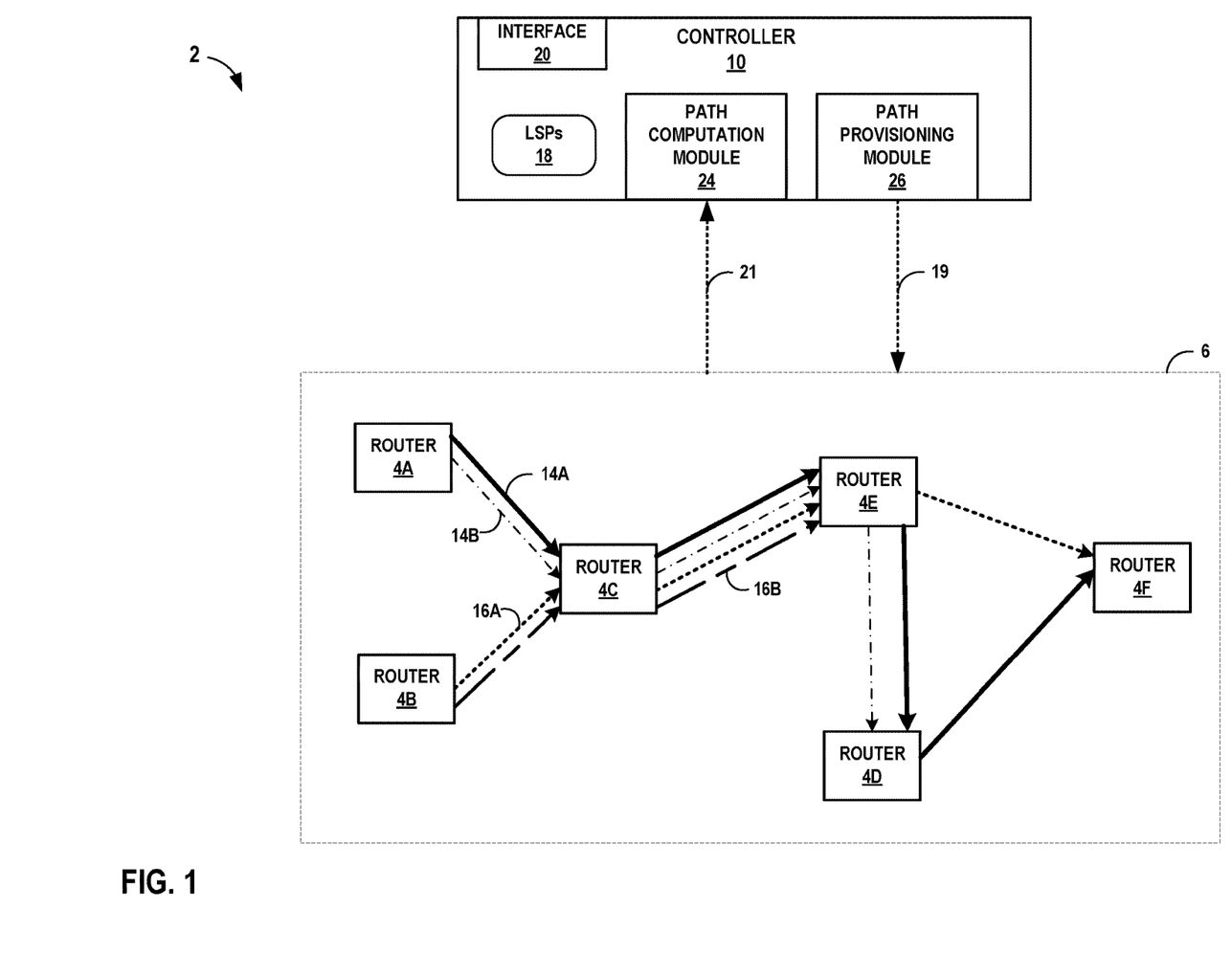
FIG. 1 is a block diagram illustrating a network system in which a path computation device is configured to compute paths for label switched paths (LSPs) in accordance with techniques of this disclosure.

FIG. 1 is a block diagram illustrating a network system in which a path computation device is configured to compute paths for label switched paths (LSPs) in accordance with techniques of this disclosure. In this example, network system 2 includes controller 10 and a Multi-Protocol Label Switching (MPLS) network 6 ("network 6") having a plurality of routers 4A-4F ("routers 4") interconnected in the illustrated topology by network links (not shown). Each pair of connected routers 4 may be connected by one or more network links, each network link representing a logical or physical link having an associated total bandwidth. Physical links of network 6 may include, for example, Ethernet PHY, Synchronous Optical Networking (SONET)/Synchronous Digital Hierarchy (SDH), Lambda, or other Layer 2 data links that include packet transport capability. Logical links of network 6 may include, for example, an Ethernet Virtual local area network (VLAN), a Multi-Protocol Label Switching (MPLS) Label Switched Path (LSP), or an MPLS traffic-engineered (TE) LSP. Various examples of network 6 may encompass many hundreds or even thousands of routers. Furthermore, although primarily described herein as routers, routers 4 may represent other types of forwarding devices, such as switches, repeaters, optical cross-connects (OXCs), optical add-drop multiplexers (OADMs), multiplexing device, or other types of devices, within network 6 that forward network traffic, including optical data. For example, routers 4 may be layer three (L3) routers optically connected by an intermediate OXC. Accordingly, the techniques described in this disclosure may be applicable not only to packet/label switched flows but also to other flow types with different types of interface switching, such as Lambda-based and time-division multiplexing (TDM)-based.

Routers 4 are members of a path computation domain served by controller 10. The path computation domain may include, for example, an Interior Gateway Protocol (e.g., Open Shortest Path First (OSPF) or Intermediate System-to-Intermediate System (IS-IS)) area, an Autonomous System (AS), multiple ASes within a service provider network, multiple ASes that span multiple service provider networks. In various examples, different combinations of routers 4 may include member routers of multiple ASes. Network links connecting routers 4 may thus be interior links, inter-AS transport links, another type of network link, or some combination thereof. While illustrated and described with respect to routers, the techniques may be applicable to any network device that implements Multi-Protocol Label Switching (MPLS) or Generalized MPLS (GMPLS), for instance.

Controller 10 is a path computation device that uses traffic engineering information 21 learned from routers 4 of network 6 to apply constraints to compute network paths for and install LSPs 18 to network 6 as MPLS traffic engineering LSPs 14A-14B, 16A, 16B (hereinafter, "LSPs 14, 16" although alternatively referred to as "TE LSPs"), in response to requests from any of routers 4 and/or requests for service paths received via interface 20. Controller 10 may represent a high-level controller for configuring and managing network 6. Controller 10 may represent one or more general-purpose servers; an appliance, controller, or other special-purpose device for computing paths; an application executed by a computing device; a distributed control plane of routers 4 that computes paths for LSPs managed the routers; and so forth. In some cases, aspects of controller 10 may distributed among one or more real or virtual computing devices. Any such devices listed above may be in-network or out-of-network. Example details of a software-defined networking (SDN) controller for a software-defined network, which may perform operations described herein to compute paths and route LSPs, are described in PCT International Patent Application PCT/US2013/044378, filed Jun. 5, 2013 and entitled, "PHYSICAL PATH DETERMINATION FOR VIRTUAL NETWORK PACKET FLOWS," which is incorporated by reference herein in its entirety.

Label-switched paths 18 ("LSPs 18") represents a data structure, such as an LSP database, that stores definitions for LSPs to be installed to network 6. Each LSP definition in LSPs defines an LSP according to source and destination routers of routers 4, as well as a required bandwidth for the LSP. In some examples, LSP definitions may include a defined route or path for the corresponding LSP at least in part, required or excluded link attributes, or other constraints for the corresponding LSP that may affect computation of a path for the corresponding LSP. LSPs 18 include LSP definitions for LSPs 14, 16. The LSP definition in LSPs 18 for LSP 14A, for example, specifies router 14A as the source, router 4F as the destination, and may specify a required bandwidth, B_14A, for LSP 14A. An administrator may set a static bandwidth for an LSP definition by configuration, or the bandwidth may be dynamic according to auto-bandwidth features of routers 4.

Controller 10 presents northbound interface 20 that may be invoked by other controllers in a hierarchical arrangement of controllers or by an orchestrator, administrator, application, or other entity, to request service paths that resolve to an LSP definition stored to LSPs 18 and implemented in part in network 6 by LSPs 14, 16. Interface 20 may be usable for integration with an orchestration system such as OpenStack; interface 20 may also or alternatively usable by other applications or the operator's Operations Support Systems (OSS)/Business Support Systems (BSS). Interface 20 may in some cases present a RESTful Application Programming Interface (API).

To obtain traffic engineering information 21, controller 10 may execute one or more network routing protocols, extended to carry traffic engineering information, to listen for routing protocol advertisements that carry such traffic engineering information. Traffic engineering information may include node and interface identifiers for routers 4; administrative weights and available bandwidth per priority level for links; LSP identifier and state information for virtual links, and other information for computing paths for traffic engineered LSPs. Controller 10 may store traffic engineering information to a traffic engineering database (TED).

As described in further detail below and in accordance with techniques described herein, example controller 10 includes a path computation module 24 configured to compute paths for LSPs 14, 16 by applying bandwidth and/or other constraints to learned traffic engineering information 21. A resulting path may be confined to a single domain or may cross several domains.

Path provisioning module 26 of controller 10 installs routed LSPs 14, 16 by sending path descriptors 19 to network 6, which configures LSPs 14, 16 according to path descriptors 19. A path descriptor may include an Explicit Route Object (ERO) for an LSP and may include information describing the corresponding path including path type (primary or detour); bandwidth for each Class of Service (CoS) value; and/or, for each node in the ordered path from ingress to egress, a node identifier, ingress label, and egress label.

According to techniques described in this disclosure, path computation module 24 computes constrained shortest paths for LSPs 18 in sets according to the various sources for the LSPs 18. In the illustrated example, the LSP definitions in LSPs 18 for LSPs 14 each have router 4A as a source. The LSP definitions in LSPs 18 for LSPs 16 each have router 4B as a source. Path computation module 24 determines the minimum bandwidth for the set of LSPs and, in some cases, prunes the network graph model of links that cannot carry at least this minimum bandwidth. The minimum bandwidth in this case denotes the common minimum bandwidth for both LSPs 14 and LSPs 16. The path computation module then applies an SPF algorithm to perform a batch computation of shortest paths to each of the destinations for LSPs 14 and shortest paths to each of the destinations for LSPs 16. Because SPF algorithms, e.g., Dijkstra, Bellman-Ford, and Flood-fill, are source-based and cumulative, in that the SPF algorithm computes shortest-paths to nearer destinations to compute shortest-paths to further destinations, path computation module 24 computes shortest paths to the multiple destinations for the LSPs (by set) on the order of computing a shortest path to a single destination (the total time taken is equal or at least similar to the time taken to compute the path to the furthest destination). (The typical time complexity for a shortest-path first algorithm to run in a network graph of n nodes is $O(n^2)$, where n is the number of vertices.) In this way, the path computation module 24 makes multiple calls to route a batch of LSPs 18 to multiple destinations on a single "run" or "iteration" of the SPF algorithm and at least in some cases reduce at least one of the time complexity (or order), computational complexity, and time taken to compute paths for the LSPs 18.

In some cases, path computation module 24 may determine respective minimum bandwidths for LSPs 14 and LSPs 16. Path computation module 24 determines the minimum bandwidths for each source node of LSPs 14 and LSPs 16, in other words. The path computation module 24 may then apply a constrained SPF (CSPF) algorithm to LSPs 14 using the minimum bandwidth determined for LSPs 14 and separately apply a CSPF algorithm to LSPs 16 using the minimum bandwidth determined for LSPs 16. For example, LSPs 14 sourced by router 4A may have a minimum bandwidth of 1 Gbps, while LSPs 16 sourced by router 4B may have a minimum bandwidth of 100 Mbps. Path computation module 24 may therefore apply CSPF with a 1 Gbps constraint for LSPs 14 and apply CSPF with a 100 Mbps constraint for LSPs 16. In some cases, this may result in fewer iterations of the routing cycle and improved bin-packing efficiency, although at the expense of a slower CSPF calculation for each of LSPs 14, 16, as compared to the common minimum bandwidth and non-constrained SPF techniques described above. Separate processing units executing respective threads of path computation module 24 may separately determine the respective minimum bandwidth and apply the respective CSPF algorithms for LSPs 14 and LSPs 16.

Having computed paths for some or all of the LSPs 18, path computation module 24 attempts to route each LSP defined in LSPs 18 on the path computed from the LSP source to the LSP destination, if any, while accounting for the required LSP bandwidth and the remaining bandwidth capacity on the links of the path. If an LSP defined in LSPs 18 is unable to be routed due to path computation module 24 previously routing one or more LSPs on the path computed for the LSP, path computation module 24 will push the LSP into a new list of LSPs to route; recalculate the minimum bandwidth of this set and may re-run or (reiterate) the SPF algorithm to try to compute a new (likely longer) path for the new list of LSPs to route, which has a reduced number of LSPs to route compared to the previous iteration. Path computation module 24 continues in this manner until either all LSPs 18 are routed or the path computation module 24 is unable to determine paths for any of the remaining LSPs in LSPs 18 remaining to be routed. As used herein, an "iteration" or "run" of the SPF algorithm refers to computing shortest-paths from a single source to one or more destinations without re-initializing the data structures for the CSPF algorithm (such as by marking all nodes as unvisited or all edges as infinity, emptying queues or stacks, and so forth).

Figure 2:
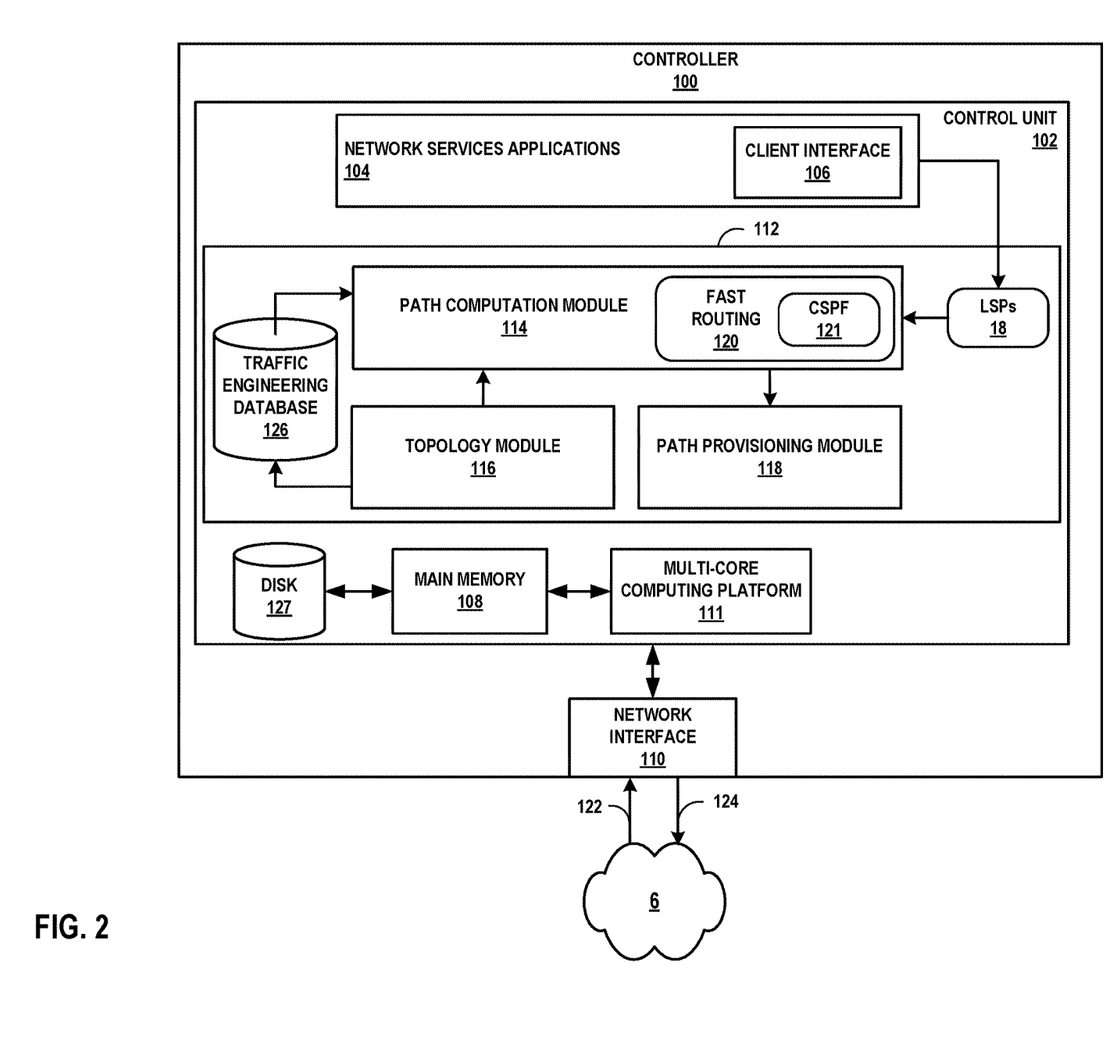
FIG. 2 is a block diagram illustrating an example path computation device configured to compute paths for label switched paths (LSPs) in accordance with techniques of this disclosure.

FIG. 2 is a block diagram illustrating an example path computation device configured to compute paths for label switched paths (LSPs) in accordance with techniques of this disclosure. Controller 100 receives path requests, computes and schedules paths that satisfy the path requests, and establishes requested paths in a path computation domain according to techniques described herein. Controller 100 may include a server or network controller, for example, and may represent an example instance of controller 10 of FIG. 1.

Controller 100 includes a control unit 102 coupled to a network interface 110 to exchange packets with other network devices by one or more inbound links 122 and one or more outbound links 124. Main memory 108 of control unit 102 represents one or more computer-readable storage media, which may include random-access memory (RAM) such as various forms of dynamic RAM (DRAM), e.g., DDR2 SDRAM, or static RAM (SRAM), Flash memory, or any other form of fixed or removable storage medium that can be used to carry or store desired program code and program data in the form of instructions or data structures and that can be accessed by a computer. Main memory 108 provides a physical address space composed of addressable memory locations accessible by modules 112, 104.

Main memory 108 is coupled to disk 127, which may comprise computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store data and instructions.

Control unit 102 in this example includes multi-core computing platform 111 to execute modules 104, 112. Multi-core computing platform includes multiple processing cores that each includes an independent execution unit to perform instructions that conform to an instruction set architecture for the core. Cores of multi-core computing platform 111 may each be implemented as separate integrated circuits (ICs) or may be combined within one or more multi-core processors (or "many-core" processors) that are each implemented using a single IC (i.e., a chip multiprocessor).

Multi-core computing platform 111 executes software instructions, such as those used to define a software or computer program, stored to main memory 108. Alternatively or additionally, control unit 102 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 102 provides an operating environment for network services applications 104 and path computation element 112. In some example, these modules may be implemented as one or more processes executing on one or more virtual machines of one or more servers. That is, while generally illustrated and described as executing on a single controller 100, aspects of modules 104, 112 may be executed on other computing devices.

Network services applications 104 represent one or more processes that provide services to clients of a service provider network that includes network 6 and controller 100 to manage connectivity in the path computation domain. Network services applications 104 may provide, for instance, include Voice-over-IP (VoIP), Video-on-Demand (VOD), bulk transport, walled/open garden, IP Mobility Subsystem (IMS) and other mobility services, and Internet services to clients of the service provider network. Networks services applications 104 require services provided by path computation element 112, such as node management, session management, and policy enforcement. One or more of network services applications 104 may include or otherwise make use of a client interface 106 by which one or more client applications request services. Client interface 106 may represent a command line interface (CLI) or graphical user interface (GUI), for instance. Client 106 may also, or alternatively, provide an application programming interface (API) such as a web service to client applications.

Network services applications 104 issue path requests to path computation element 112 to request paths in a path computation domain controlled by controller 100. For example, a path request may include a required bandwidth or other constraint and two endpoints representing a source and a destination that communicate over the path computation domain managed by controller 100. Control unit 102 stores path requests as respective LSP definitions in the LSPs 18 data structure. In some cases, the service provider or other administrator of network 6 may configure, via an administrative interface, one or more LSP definitions in LSPs 18.

Path computation element 112 accepts path requests from network services applications 104 to establish paths between the endpoints over the path computation domain. Paths may be requested for different times and dates and with disparate bandwidth requirements. Path computation element 112 reconciles path requests from network services applications 104 to multiplex requested paths onto the network 6 path computation domain based on requested path parameters and network resource availability.

To intelligently compute and establish paths through the path computation domain, path computation element 112 includes topology module 116 to receive traffic engineering information, such as traffic engineering information 21 of FIG. 1, describing available resources of network 6, including routers 4 and interfaces thereof and interconnecting network links. Topology module 116 may execute one or more southbound protocols, such as Open Shortest Path First with Traffic Engineering extensions (©SPF-TE), Intermediate System to Intermediate System with Traffic Engineering extensions (ISIS-TE), BGP Link State (BGP-LS), to learn traffic engineering information for network 6.

Traffic engineering database (TED) 126 stores traffic engineering information, received by topology module 116, for network 6 that constitutes a path computation domain for controller 100. TED 126 may include one or more link-state databases (LSDBs), where link and node data is received in routing protocol advertisements, received from a topology server, and/or discovered by link-layer entities such as an overlay controller and then provided to topology module 116. In some instances, the service provider or other administrative entity may configure traffic engineering or other topology information within TED 126 via an administrative interface.

In accordance with techniques described in this disclosure and to satisfy path requests from network services applications and/or administratively-configured paths, path computation module 114 of path computation element 112 executes fast routing module 128 to computes paths for LSP 18s through the path computation domain made up of network 6 and route LSPs 18 to the computed paths. Fast routing module 128 applies techniques described in this disclosure to compute, using CSPF 121, constrained shortest paths that satisfy constraints for LSPs 18, such as common and/or separate minimum bandwidth for LSPs having common source nodes. Upon determine the paths, fast routing module 128 routes the LSPs 18 onto a model of the network defined by a state of TED 224. However, an LSP of LSPs 18 may only be routed to a path if there is available reservable capacity on the links of the paths sufficient to meet the bandwidth requirements for the LSP. Because multiple paths computed for LSPs 18 may have links in common and because multiple LSPs 18 may have the same computed path, fast routing module 128 may be unable to route all of LSPs 18 using the initially computed shortest paths. Fast routing module 128 may therefore reiterate, computing new shortest paths using CSPF 121 for those LSPs 18 for which a path existed but that could not be routed due to another LSP being routed first, thereby consuming the bandwidth for at least one link of the path.

To compute shortest paths, fast routing module 128 applies CSPF 121 on an LSP source-specific basis to determine shortest paths to all destinations for a given source defined in LSPs 18 with one "run" of the CSPF 121, i.e., without re-initializing the SPF 121 algorithm (whether Dijkstra, Bellman-Ford, Flood-fill, or another SPF algorithm). This is described in further detail below. Although described as CSPF 121, fast routing module 128 may in some cases apply non-constrained SPF, as described elsewhere in this disclosure.

Aspects of fast routing module 120 may be executed in parallel on different execution units of multi-core computing platform 111. For example, each source to all destinations shortest path computation is an independent operation. Path computation module 114 may therefore spawn different threads executing in parallel on multi-core computing platform 111 to concurrently execute CSPF 121 to compute suitable shortest paths for multiple sources (to respective destinations) in parallel. In some examples, fast routing module 120 applies suitable locking constructs, such as mutexes or semaphores, to provide exclusive access to a queue or other data structure that stores a list of sources to which the different threads are to apply CSPF 121.

For example, fast routing module 120 may ensure that the paths from each source to the destinations for the source are stored in separate parts of main memory 108 and not shared between the threads. Fast routing module 120 may then proceed with parallel processing by forming a list of sources which require path computation. Fast routing module 120 may then create and launch a set of worker threads to perform path computations.

Each worker thread looks in the list of sources remaining to be processed and takes the first one that is free. The worker thread may then lock the source to prevent another thread from accessing the same memory, compute the paths to the destination list for the source, and set a flag on the source to indicate that the path computation to all destinations for the source is complete.

In this way, path computation module 114 exploits parallelism present in the fast routing algorithm described herein to accelerate the computation of multiple runs of CSPF 121. In instances in which multiple routers 4 cooperatively implement controller 100 (i.e., controller 100 is decentralized among routers 4), one or more of routers 4 may execute as a "thread" to execute CSPF 121 for the corresponding set of LSPs sourced by the router.

Having determined shortest paths for all of the LSPs 18, fast routing module 120 attempts to set the paths onto the LSPs 18 (alternatively referred to as "flows") according to the network model defined by TED 126. Fast routing module 120 may apply multiple iterations of path computation and attempt to set the paths onto the LSPs 18, until no further shortest paths are available for those LSPs of LSPs 18 that remain to be routed.

Path provisioning module 118 of controller 100 programs the routes for routed LSPs of LSPs 18 into network 6 to cause the state of network 6 to match the state of network 6 as determined by path computation module 114. Path provisioning module 118 may represent an example of path provisioning module 26 of FIG. 1. In general, paths are unidirectional. Provisioning a path may require path validation prior to committing the path to provide for packet transport. Path provisioning module 118 executes one or more southbound protocols for path provisioning to inject state into elements of network 6, such as any one or more of routers 4. For example, southbound protocols may include Path Computation Element (PCE) Communication Protocol (PCEP), Open Shortest Path First with Traffic Engineering extensions (OSPF-TE), Intermediate System to Intermediate System with Traffic Engineering extensions (ISIS-TE), BGP Link State (BGP-LS), NETCONF/Yang, Interface to the Routing System (I2RS) protocols, CLIs for the network elements, Simple Network Management Protocol (SNMP), and OpenFlow (or other SDN protocol). Path provisioning module 118 may provide an ERO for routed LSPs 18 to source routers for the routed LSPs, which may then signal the LSPs using RSVP-TE, as one example.

Figure 3:
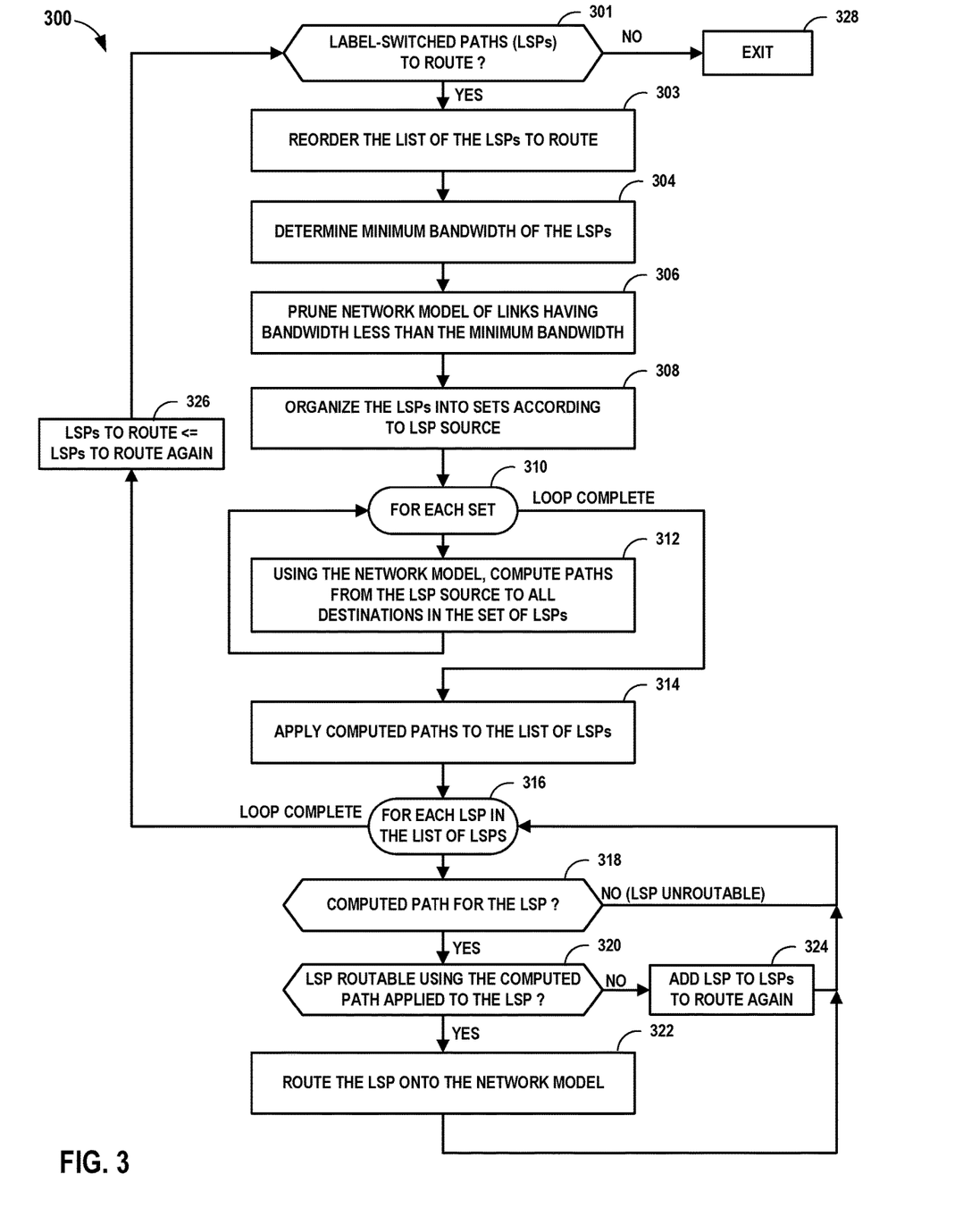
FIG. 3 is a flowchart illustrating an example mode of operation for one or more controllers to compute shortest paths for and route LSPs according to techniques described in this disclosure.

FIG. 3 is a flowchart illustrating an example mode of operation for one or more controllers to compute shortest paths for and route LSPs according to techniques described in this disclosure. Operation 300 is described with respect to controller 10 of FIG. 1 but may be applied by controller 100 of FIG. 2, or by a decentralized control plane made up of multiple controllers or router control planes for instance.

Path computation module 24 of controller 10 obtains a non-empty list of LSPs 18 to route and initializes this as a list of LSPs to route. The list of LSPs to route is non-empty in this iteration (YES branch of 301). Path computation module 24 re-orders the list of LSPs to route (303); for example, path computation module 24 may re-order randomly by bandwidth, order of ascending bandwidth (route smallest LSPs by lowest bandwidth first), or order of descending bandwidth (route largest LSPs by highest bandwidth first).

Path computation module 24 also determines the minimum bandwidth among the list of LSPs to route (304). In some cases, the minimum bandwidth is zero. Using a network model (e.g., graph) for network 6 that encompasses routers 4 and links interconnecting routers 4, each link having an associated bandwidth, path computation module 24 prunes (removes from) the network model of all links that have a bandwidth less than the minimum bandwidth (306). Such links are unsuited for any of the LSPs to route.

Path computation module 24 organizes each LSP of the list of LSPs to route into a different set of LSPs by source (308). LSPs of the list of LSPs that have the same source (e.g., router 4A) are elements of the same set of LSPs. LSPs of set of LSPs thus have a common source but may have many different destinations. For example, LSPs 14 have a common source router 4A, but the destination for LSP 14A is router 4F and the destination for LSP 14B is router 4D.

For each set of LSPs determined at step 308 (310), path computation module 24 executes an SPF algorithm on the pruned network model determined in step 306 to compute paths from the source for the set of LSPs to each of the destinations for the set of LSPs (312). Path computation module 24 may execute the SPF algorithm without reinitializing the algorithm for any of the LSPs in the set of LSPs. Again, using LSPs 14 as an example of a set of LSPs, path computation module 24 may determine during the SPF run a shortest path for LSP 14B as 4A-4C-4E-4D. Because SPF is cumulative, path computation module 24 continues the SPF run to find the shortest path for LSP 14A as the path for LSP 14B concatenated with 4D-4F, in the illustrated example. The iterations of loop (310), i.e., the computed of shortest paths for each set of LSPs by source, may be executed in parallel in a multi-threaded computing environment provided by an operating system executing on a plurality of execution units of one or more programmable processors. Path computation module 24 may execute a Flood-fill algorithm to perform (312), in which edges are pre-sorted on each node by ascending metric to reduce the algorithmic complexity. In effect, Flood-fill takes out nearly an entire inner loop searching over the edges on a node, which is at the center of the algorithm loop. Further, Flood-fill as used herein may use edges rather than link to make it more efficient to find the attached mode. To sort the edges and prune the links at (306), the algorithm may add a large penalty to edges if the corresponding linked has failed, is down, or there is insufficient bandwidth capacity to transport the minimum bandwidth determined in (304). The algorithm may further set a "useable link count" on each node by the count of links with metric less than the penalty. The algorithm then uses this "useable link count" so that only these links are considered for routing the LSPs to route.

Having computed shortest paths for each of the sets of LSPs, path computation module 24 may apply the computed shortest paths to the LSPs to associate each of the LSPs to route with its computed shortest path, if any (314). Path computation module 24 then attempts to route the LSPs to route onto the network model by, for each LSP of the LSPs to route in the ordering determined in step 302 (316), determining whether a shortest path exists in the network that meets the constraints for the LSP (318). If no such path exists for the LSP (NO branch of 318), path computation module 24 marks or other denotes the LSP as unroutable. Otherwise (YES branch of 318), path computation module 24 determines whether the LSP is routable on its computed path by determining whether the network links that constitute the computed path for the LSP have adequate remaining bandwidth. If so (YES branch of 320), path computation module 24 routes the LSP on the network model, which may include reducing the available bandwidth for the network links that constitute the computed path by the required bandwidth for the LSP (322). If there is insufficient bandwidth capacity for the LSP (NO branch of 320), path computation module 24 adds the LSP to a list of LSPs to route again in another iteration of operation 300.

Having performed loop 316 for the LSPs to route, path computation module 24 has routed at least one of the LSPs to route onto the network model and/or determined that one of the LSPs to route is unroutable. In other words, with each pass of the loop 316 the minimum bandwidth of the new set of LSPs to route is computed and the network graph pruned of the links that cannot carry this bandwidth, and the list of remaining LSPs to route gets smaller—at least one LSP of the LSPs to route will be routed (or determined to be unroutable) and the LSPs to route is reduced per iteration. Typically, earlier iterations will result in larger size reductions than later iterations.

In preparation for another iteration, path computation module 24 may set the list of LSPs to route to the list of LSPs to route again (326). If any there are no LSPs to route (NO branch of 301), path computation module 24 exits the mode of operation (328). Path provisioning module 26 may thereafter program the network model determined by path computation model 24. If there are again LSPs to route (YES branch of 301), path computation model 24 continues iterating operation 300 until the (NO branch of 301) is reached.

Operation 300 thus assumes a batch-processing approach for multiple LSPs at a time for different sets of LSPs by source. This batch-processing may enable the path computation module 24 to route as many LSPs as possible on the shortest paths before pruning the network graph (306) and looking for potentially longer paths. As a result, the techniques may make improve the utilization of the available capacity on the network in many cases.

Figure 4:
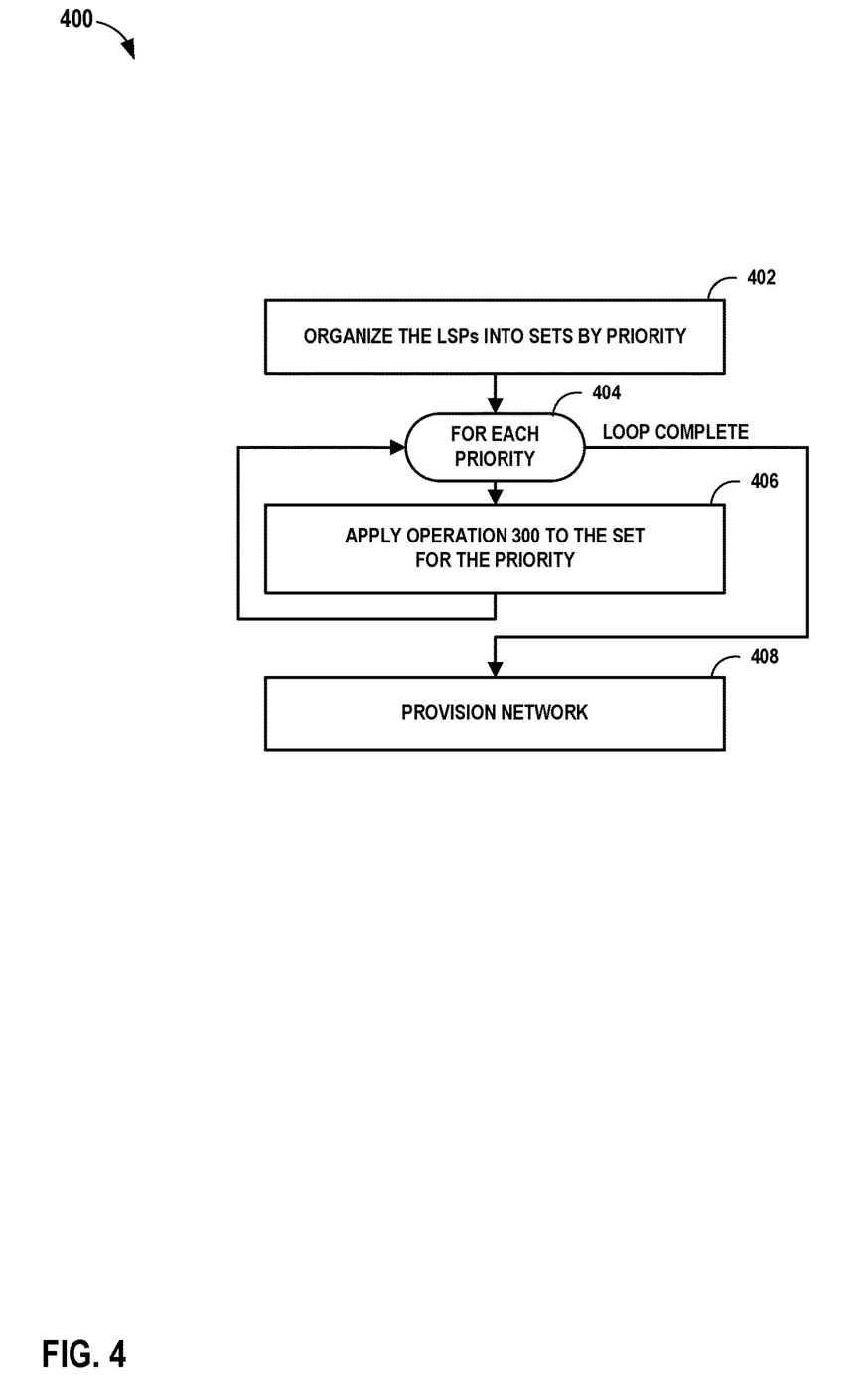
FIG. 4 is a flowchart illustrating an example mode of operation for one or more controllers to compute shortest paths for and route LSPs by priority according to techniques described in this disclosure.

FIG. 4 is a flowchart illustrating an example mode of operation for one or more controllers to compute shortest paths for and route LSPs by priority according to techniques described in this disclosure. Operation 400 is described with respect to controller 10 of FIG. 1 but may be applied by controller 100 of FIG. 2, or by a decentralized control plane made up of multiple controllers or router control planes for instance.

In some examples of controller 10 and controller 100, LSPs 18 are each associated with a different setup priority. A setup priority determines whether a new LSP that preempts an existing LSP can be established. For preemption to occur, the setup priority of the new LSP must be higher than that of the existing LSP. Also, the act of preempting the existing LSP must produce sufficient bandwidth to support the new LSP. That is, preemption occurs only if the new LSP can be set up successfully. The setup priority for an LSP can be, for instance, any value in the range [0:N], with value 0 corresponding to the highest priority and value N corresponding to the lowest priority.

Path computation module 24 may organize LSPs 18 into sets of LSPs to be routed by setup priority (402). Beginning with the set of LSPs to be routed that have the highest priority and iterating through to the set of LSPs to be routed that have the lowest priority (404), path computation module 24 may apply operation 300 of FIG. 3 to batch-process LSPs of the set and route the LSPs to the network model for network 6, as described in FIG. 3 (406). As a result, higher-priority LSPs of LSPs 18 may be processed earlier in the operation 400 and have a higher likelihood of being routed relative to lower-priority LSPs of LSPs 18. In addition, higher-priority LSPs are more likely to be set to shorter paths than lower-priority LSPs having the same source and destination. Having processed each LSP of LSPs 18 as either routed to the network model or unroutable, path provisioning module 26 may program the network model determined by path computation model 24 into network 6 by, e.g., communicating with routers 4 to install LSP state and initiate RSVP-TE setup operations.

Example pseudo-code for operation 400 including operation 300 as (406) is as follows:

```
/*********************************************/
[Filter the LSPs to select only the ones with the priority level
currently being routed]
[Starting with priority=0,then priority=1, . . . , priority -N]
/* num_lsps_to_route is the initial count of the LSPs */
[Find the minimum bandwidth of the LSP set (min_bw)]
[Reorder this list to start the Main Loop for this priority level]
[Main Loop:
while(num_lsps_to_route>0 &&
num_lsps_to_route<prev_num_lsps_to_route) {
  [Sort lsps_to_route ( . . . sort_option)]
  [Prune network, removing from activity edges that cannot carry
min_bw extra traffic]
  [Sort the remaining edges on each node in increasing metric]
  [Find routes in the network for the LSPs and push these if possible
onto the network:
    /* analyze to sort the LSP status and allocate to the appropriate array */
    for (i=0; i<num_lsps_to_route; i++) {
      lsp = lsps_to_route[i] ;
      if(lsp->is_routed) {
         lsps_routed[num_lsps_routed] = lsp;
         priority_bw_routed += lsp->lsp_bw;
         num_lsps_routed++;
      } else {
      path = lsp->paths[CONV_NORMAL_PATH] ;
      if(path==NULL || path->interface_list_count==0) {
         /* not possible to find a path with the min_bw so give up */
         lsps_unroutable[num_lsps_unroutable] = lsp;
         num_lsps_unroutable++;
      } else
      { /* there is a path but not sufficient capacity because
another LSP got there
         first: - so put it in the list of LSPs to try again */
         lsps_to_route_again[num_lsps_to_route_again] = lsp;
         lsp_bw = lsp->lsp_bw;
         if(lsp_bw<min_bw) {
            min_bw =lsp_bw;
         }
         num_lsps_to_route_again ++;
      }
     }
    }
    /* copy the routes into the working list of routes to find/push
next time round */
    for (i=0; i<num_lsps_to_route_again; i++) {
      /* random shuffle */
      j = rand() %(i+1);
      if (j !=i) {
         lsps_to_route[i] = lsps_to_route[j] ;
      }
      lsps_to_route[j] = lsps_to_route_again[i] ;
    }
  ]
  /* Go to Main Loop */
]
```

In some cases, LSPs 18 may have constraints such as required-to-use or forbidden-to-use links having some attribute. In such cases, LSPs 18 may be organized such that path computation module 24 applies operation 400 separately to LSPs having different such attributes, with the network model pruned of links that do or don't match (as appropriate) the attribute constraint.

Figure 5:
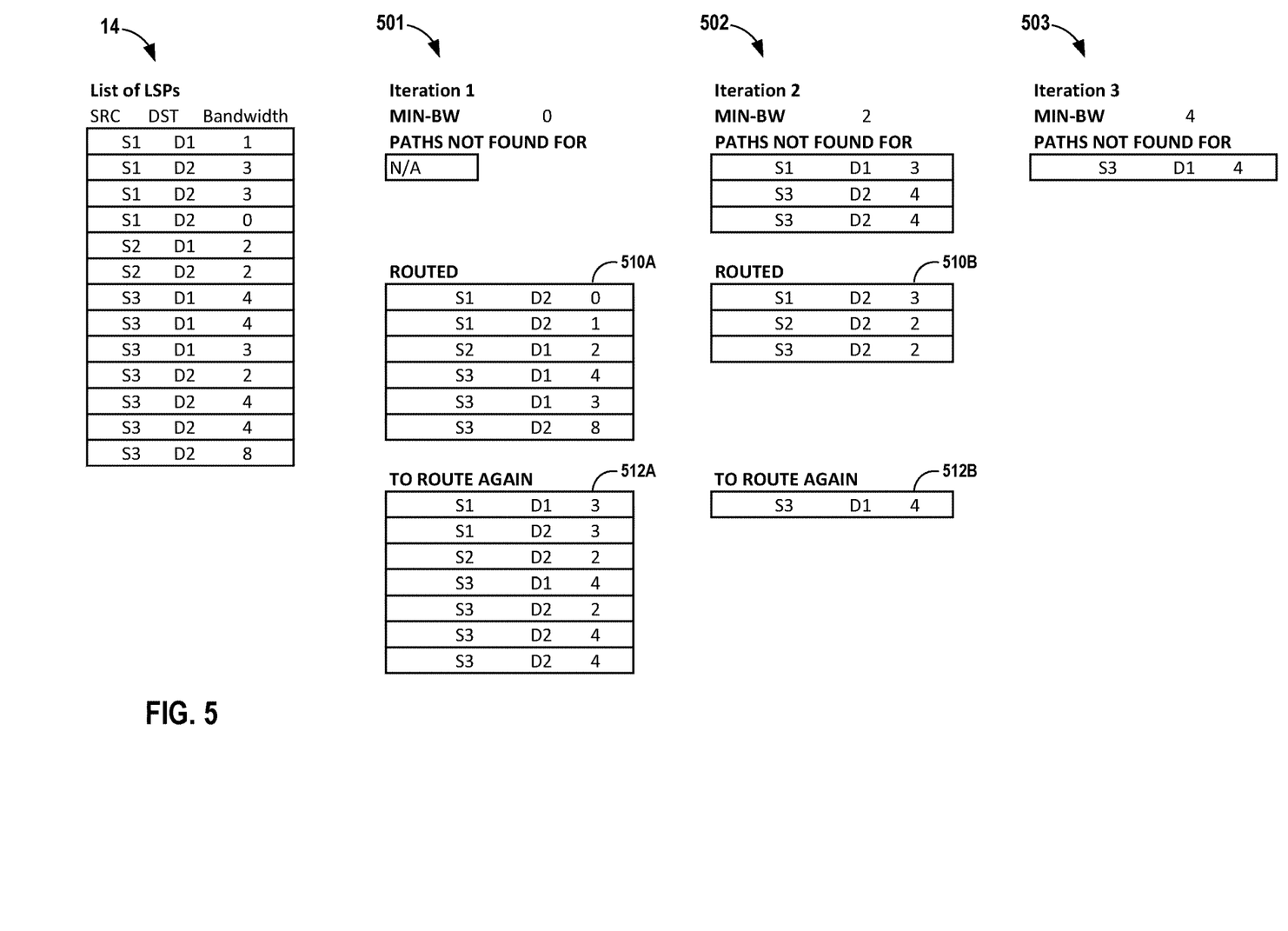
FIG. 5 depicts tables illustrating an example execution of the model of operation of FIG. 3, according to techniques described herein.

FIG. 5 depicts tables illustrating an example execution of operation 300 of FIG. 3, according to techniques described herein. Beginning with a lists of LSPs 18 having each having a source (SRC), destination (DST), and bandwidth (bandwidth values for illustrative purposes only and not indicative of likely bps required per LSP), a controller 10 determines a minimum bandwidth for the list of LSP to route, computes paths by source, and attempts to route the LSPs along the computed paths. Successfully routed paths are included in the tables 510A-510B ("routed"), while LSPs to route again are depicted in tables 512A-512B ("to route again"). This example execution of operation 300 does not find paths and is unable to route some of the LSPs, as shown in tables 508B-508C ("paths not found for").

Figure 6:
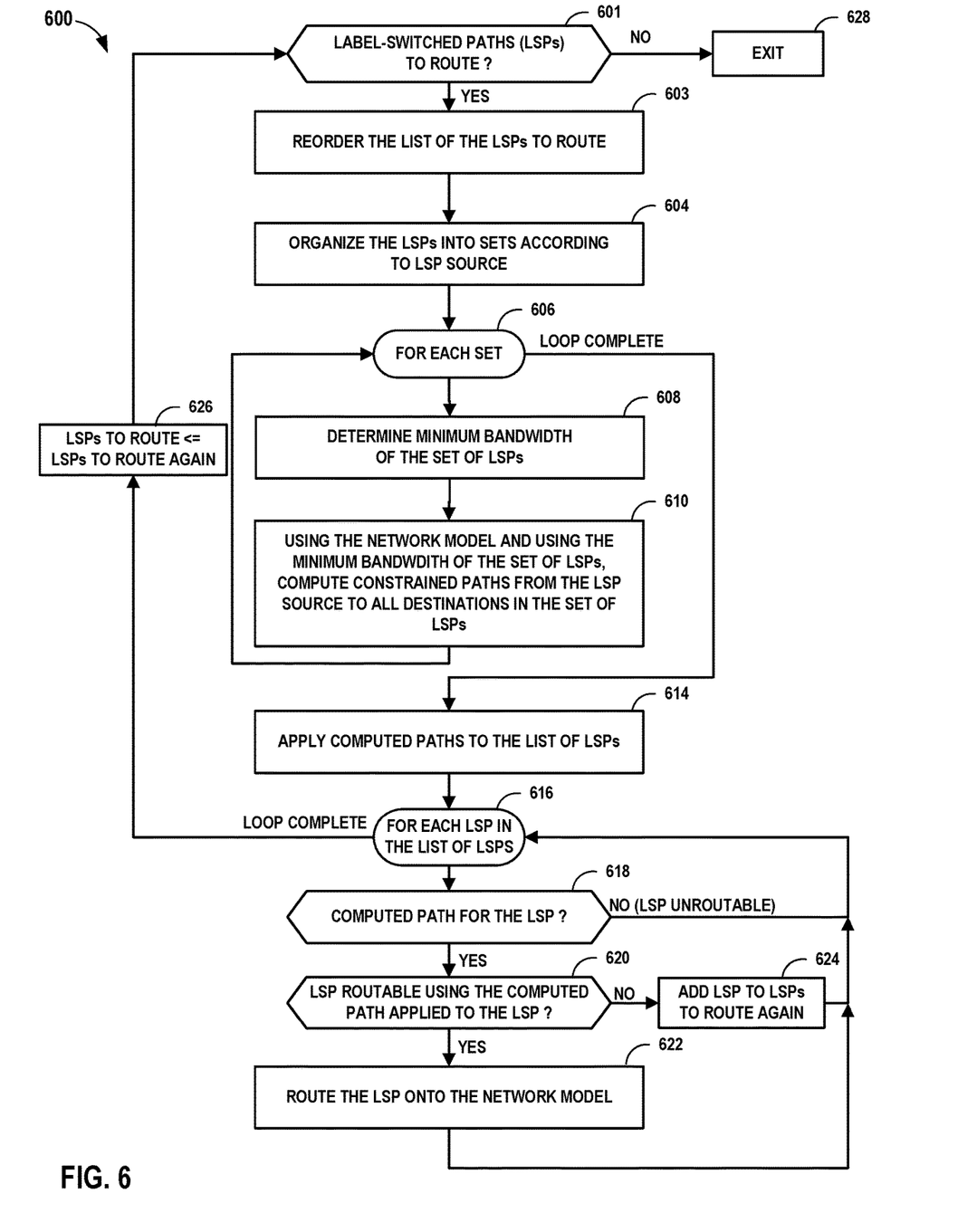
FIG. 6 is a flowchart illustrating an example mode of operation for one or more controllers to compute shortest paths for and route LSPs according to techniques described in this disclosure.

FIG. 6 is a flowchart illustrating an example mode of operation for one or more controllers to compute shortest paths for and route LSPs according to techniques described in this disclosure. Operation 600 is described with respect to controller 10 of FIG. 1 but may be applied by controller 100 of FIG. 2, or by a decentralized control plane made up of multiple controllers or router control planes for instance.

Path computation module 24 of controller 10 obtains a non-empty list of LSPs 18 to route and initializes this as a list of LSPs to route. The list of LSPs to route is non-empty in this iteration (YES branch of 601). Path computation module 24 re-orders the list of LSPs to route (603); for example, path computation module 24 may re-order randomly by bandwidth, order of ascending bandwidth (route smallest LSPs by bandwidth first), or order of descending bandwidth (route largest LSPs by bandwidth first).

Path computation module 24 organizes each LSP of the list of LSPs to route into a different set of LSPs by source (604). LSPs of the list of LSPs that have the same source (e.g., router 4A) are elements of the same set of LSPs. LSPs of set of LSPs thus have a common source but may have many different destinations. For example, LSPs 14 have a common source router 4A, but the destination for LSP 14A is router 4F and the destination for LSP 14B is router 4D.

For each set of LSPs determined at step 604 (606), path computation module 24 calculates the minimum bandwidth of the set (608). In some cases, the minimum bandwidth is zero. In this example mode of operation, path computation module 24 further executes a constrained SPF (CSPF) algorithm, constrained by the minimum bandwidth of the set, to compute paths from the source for the set of LSPs to each of the destinations for the set of LSPs (610). Path computation module 24 executes the CSPF algorithm without reinitializing the algorithm for any of the LSPs in the set of LSPs. Again, using LSPs 14 as an example of a set of LSPs, path computation module 24 may determine during the CSPF run a shortest path for LSP 14B as 4A-4C-4E-4D. Because CSPF is cumulative, path computation module 24 continues the CSPF run to find the shortest path for LSP 14A as the path for LSP 14B concatenated with 4D-4F, in the illustrated example. The iterations of loop (606), i.e., the computed of shortest paths for each set of LSPs by source, may be executed in parallel in a multi-threaded computing environment provided by an operating system executing on a plurality of execution units of one or more programmable processors. Path computation module 24 may execute a Flood-fill algorithm to perform (610), in which edges are pre-sorted on each node by ascending metric to reduce the algorithmic complexity. In effect, Flood-fill takes out nearly an entire inner loop searching over the edges on a node, which is at the center of the algorithm loop. Further, Flood-fill as used herein may use edges rather than link to make it more efficient to find the attached mode.

Having computed constrained shortest paths for each of the sets of LSPs, path computation module 24 may apply the computed shortest paths to the LSPs to associate each of the LSPs to route with its computed shortest path, if any (614). Path computation module 24 then attempts to route the LSPs to route onto the network model by, for each LSP of the LSPs to route in the ordering determined in step 603 (616), determining whether a shortest path exists in the network that meets the constraints for the LSP (618). If no such path exists for the LSP (NO branch of 618), path computation module 24 marks or other denotes the LSP as unroutable. Otherwise (YES branch of 618), path computation module 24 determines whether the LSP is routable on its computed path by determining whether the network links that constitute the computed path for the LSP have adequate remaining bandwidth. If so (YES branch of 620), path computation module 24 routes the LSP on the network model, which may include reducing the available bandwidth for the network links that constitute the computed path by the required bandwidth for the LSP (622). If there is insufficient bandwidth capacity for the LSP (NO branch of 620), path computation module 24 adds the LSP to a list of LSPs to route again in another iteration of operation 600.

Having performed loop 616 for the LSPs to route, path computation module 24 has routed at least one of the LSPs to route onto the network model and/or determined that one of the LSPs to route is unroutable. In other words, with each pass of the loop 616 the minimum bandwidth of the new set of LSPs to route is computed and the network graph pruned of the links that cannot carry this bandwidth, and the list of remaining LSPs to route gets smaller—at least one LSP of the LSPs to route will be routed (or determined to be unroutable) and the LSPs to route is reduced per iteration. Typically, earlier iterations will result in larger size reductions than later iterations.

In preparation for another iteration, path computation module 24 may set the list of LSPs to route to the list of LSPs to route again (626). If any there are no LSPs to route (NO branch of 601), path computation module 24 exits the mode of operation (628). Path provisioning module 26 may thereafter program the network model determined by path computation model 24. If there are again LSPs to route (YES branch of 601), path computation model 24 continues iterating operation 600 until the (NO branch of 601) is reached.

Operation 600 thus assumes a batch-processing approach for multiple LSPs at a time for different sets of LSPs by source. This batch-processing may enable the path computation module 24 to route as many LSPs as possible on the constrained shortest paths before looking for potentially longer paths. As a result, the techniques may make improve the utilization of the available capacity on the network in many cases.

Figure 7:
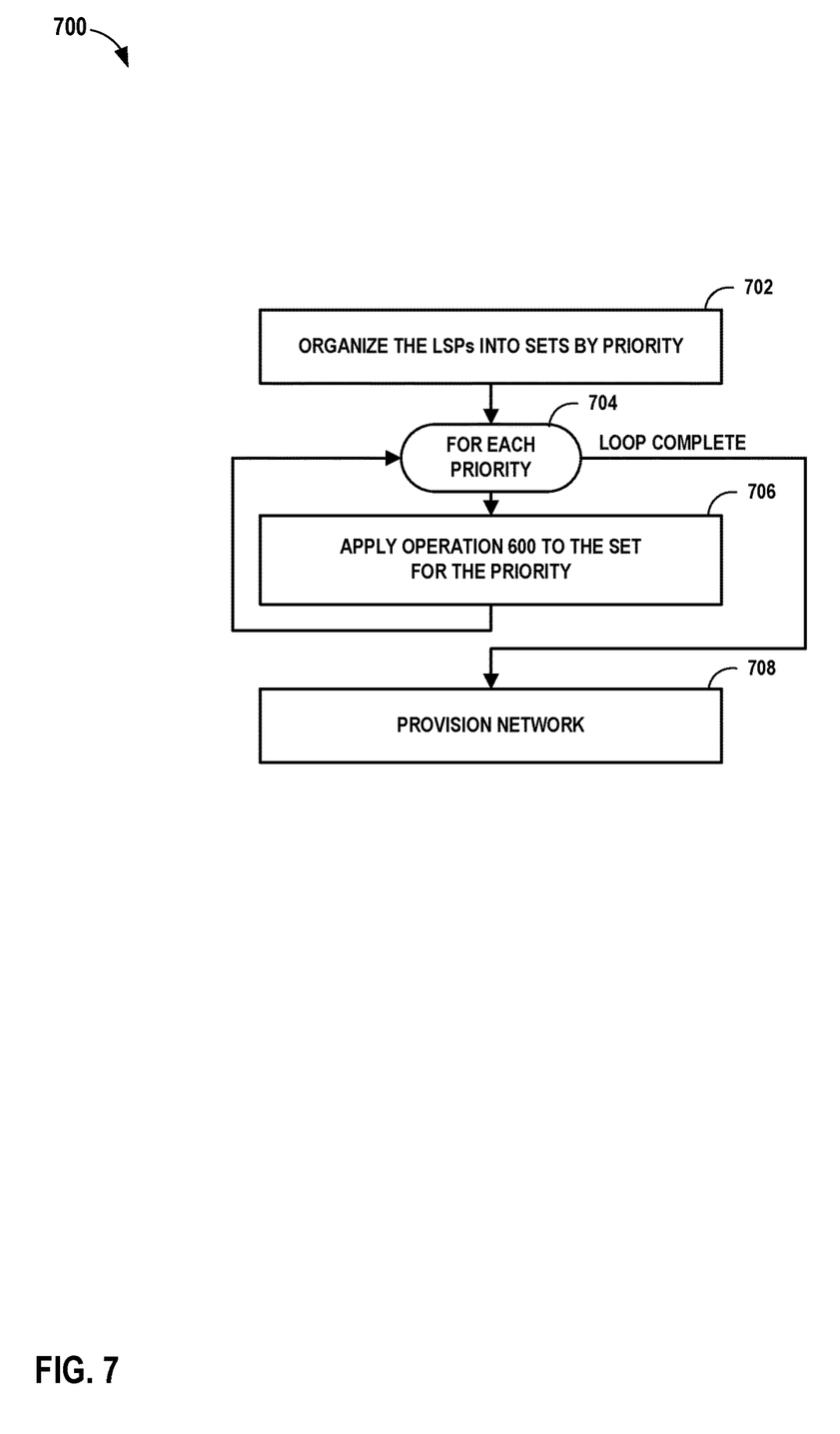
FIG. 7 is a flowchart illustrating an example mode of operation for one or more controllers to compute shortest paths for and route LSPs by priority according to techniques described in this disclosure.

FIG. 7 is a flowchart illustrating an example mode of operation for one or more controllers to compute shortest paths for and route LSPs by priority according to techniques described in this disclosure. Operation 400 is described with respect to controller 10 of FIG. 1 but may be applied by controller 100 of FIG. 2, or by a decentralized control plane made up of multiple controllers or router control planes for instance.

In some examples of controller 10 and controller 100, LSPs 18 are each associated with a different setup priority. A setup priority determines whether a new LSP that preempts an existing LSP can be established. For preemption to occur, the setup priority of the new LSP must be higher than that of the existing LSP. Also, the act of preempting the existing LSP must produce sufficient bandwidth to support the new LSP. That is, preemption occurs only if the new LSP can be set up successfully. The setup priority for an LSP can be, for instance, any value in the range [0:N], with value 0 corresponding to the highest priority and value N corresponding to the lowest priority.

Path computation module 24 may organize LSPs 18 into sets of LSPs to be routed by setup priority (702). Beginning with the set of LSPs to be routed that have the highest priority and iterating through to the set of LSPs to be routed that have the lowest priority (704), path computation module 24 may apply operation 600 of FIG. 6 to batch-process LSPs of the set and route the LSPs to the network model for network 6, as described in FIG. 6 (706). As a result, higher-priority LSPs of LSPs 18 may be processed earlier in the operation 700 and have a higher likelihood of being routed relative to lower-priority LSPs of LSPs 18. In addition, higher-priority LSPs are more likely to be set to shorter paths than lower-priority LSPs having the same source and destination. Having processed each LSP of LSPs 18 as either routed to the network model or unroutable, path provisioning module 26 may program the network model determined by path computation model 24 into network 6 by, e.g., communicating with routers 4 to install LSP state and initiate RSVP-TE setup operations.

The pseudo-code provided above for operation 400 may be similar in some respect to pseudo-code for operation 700, the necessary changes being made to implement operation 600 rather than operation 300.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A path computation device for a network, the path computation device comprising:

a multi-core computing platform comprising one or more computing cores coupled to memory;

a path computation module configured for execution by the multi-core computing platform to:
obtain a plurality of label switched path definitions to be routed, each of the label switched path definitions specifying a source and a destination for a label switched path;
organize the plurality of label switched path definitions into sets of label switched path definitions by source, wherein a first set of the sets of label switched path definitions have a first common source, and wherein a second set of the sets of label switched path definitions have a second common source;
execute, on a first core of the computing cores, one run of a constrained shortest path first (CSPF) algorithm to compute first shortest paths of the network from the first common source to respective destinations of the first set of label switched path definitions without re-initializing data structures of the CSPF algorithm,
execute, at least partially in parallel with computation of the first shortest paths, on a second core of the computing cores, another run of the CSPF algorithm to compute second shortest paths of the network from the second common source to respective destinations of the second set of label switched path definitions without re-initializing data structures of the CSPF algorithm; and a path provisioning module configured for execution by the multi-core computing platform to provision at least one of the first shortest paths of the network in the network.

2. The path computation device of claim 1, wherein the first common source and the second common source are different sources.

3. The path computation device of claim 1, wherein to provision the at least one of the shortest paths of the network in the network the path provisioning module is configured to install, to the network for a first label switched path definition of the first set of label switched path definitions, a first label switched path according to a first one of the first shortest paths from the first common source to the destination for the first label switched path definition.

4. The path computation device of claim 1,
wherein the path computation module is further configured to route, to a network model of the network, a first label switched path definition of the first set of label switched path definitions to a first one of the first shortest paths from the first common source to the destination for the first label switched path definition, and
wherein to provision the at least one of the shortest paths of the network in the network the path provisioning module is configured to install, to the network and after the path computation module has routed the first label switched path definition to the first one of the first shortest paths on the network model, a first label switched path for the first label switched path definition as routed to the first one of the first shortest paths.

5. The path computation device of claim 4, wherein the path computation module is configured to route, to the network model of the network, the first label switched path definition of the first set of label switched path definitions to the first one of the first shortest paths in response to a determination the first one of the first shortest paths satisfies a bandwidth required for the first label switched path definition.

6. The path computation device of claim 4, wherein the path computation module is configured to, in response to a determination that a second one of the first shortest paths from the first common source to the destination for a second label switched path definition does not satisfy a bandwidth required for the second label switched path definition, add the second label switch path definition to a set of label switch path definitions to route again.

7. The path computation device of claim 4,
wherein the path computation module is configured to compute an additional shortest path of the network from the first common source to the destination for a second label switched path definition and route, to the network model of the network, the second label switched path definition to the additional shortest path, and
wherein to provision the at least one of the shortest paths of the network in the network the path provisioning module is configured to install, to the network, a second label switched path for the second label switched path definition as routed to the second shortest path.

8. The path computation device of claim 1, wherein to compute the first shortest paths the path computation module is configured to:
determine a minimum bandwidth of respective bandwidths required for the first set of label switched path definitions; and
compute the first shortest paths to each satisfy the minimum bandwidth.

9. The path computation device of claim 8, wherein a first one of the first shortest paths from the first common source to a destination of a first one of the first set of label switched path definitions does not satisfy the bandwidth required for the first one of the first set of label switched path definitions.

10. The path computation device of claim 1, wherein to compute the first shortest paths the path computation module is configured to:
initialize the CSPF algorithm; and
after initialization of the CSPF algorithm, apply the CSPF algorithm to compute the first shortest paths of the network from the first common source to respective destinations of the first set of label switched path definitions without re-initialization of the CSPF algorithm for any of the first set of label switched path definitions prior to an attempt to route the first set of label switched path definitions.

11. A method comprising:
obtaining, by a controller comprising a multi-core computing platform comprising one or more computing cores, a plurality of label switched path definitions to be routed, each of the label switched path definitions specifying a source and a destination for a label switched path;
organizing, by the controller, the plurality of label switched path definitions into sets of label switched path definitions by source, wherein a first set of the sets of label switched path definitions have a first common source, and wherein a second set of the sets of label switched path definitions of the sets have a second common source;
by the controller, on a first core of the computing cores, executing one run of a constrained shortest path first (CSPF) algorithm to compute first shortest paths of the network from the first common source to respective destinations of the first set of label switched path definitions without re-initializing data structures of the CSPF algorithm;

by the controller, at least partially in parallel with computing the first shortest paths, on a second core of the computing cores, executing another run of the CSPF algorithm to compute-second shortest paths of the network from the second common source to respective destinations of the second set of label switched path definitions without re-initializing data structures of the CSPF algorithm; and provisioning, by the controller, at least one of the first shortest paths of the network in the network.

12. The method of claim 11, wherein the provisioning comprises installing, by the controller to the network for a first label switched path definition of the first set of label switched path definitions, a first label switched path according to a first one of the first shortest paths from the first common source to the destination for the first label switched path definition.

13. The method of claim 11,
routing, by the controller to a network model of the network, a first label switched path definition of the first set of label switched path definitions to a first one of the first shortest paths from the first common source to the destination for the first label switched path definition,
wherein the provisioning comprises installing, by the controller to the network and after routing the first label switched path definition to the first one of the first shortest paths on the network model, a first label switched path for the first label switched path definition as routed to the first one of the first shortest paths.

14. The method of claim 13, further comprising:
routing, by the controller to the network model of the network, the first label switched path definition of the first set of label switched path definitions to the first one of the first shortest paths in response to a determination the first one of the first shortest paths satisfies a bandwidth required for the first label switched path definition.

15. The method of claim 13, further comprising:
by the controller, in response to determining that a second one of the first shortest paths from the first common source to the destination for a second label switched path definition does not satisfy a bandwidth required for the second label switched path definition, add the second label switch path definition to a set of label switch path definitions to route again.

16. The method of claim 13, further comprising:
computing, by the controller, an additional shortest path of the network from the first common source to the destination for a second label switched path definition and route, to the network model of the network, the second label switched path definition to the additional shortest path,
wherein the provisioning comprises installing, by the controller to the network, a second label switched path for the second label switched path definition as routed to the second shortest path.

17. The method of claim 11, wherein computing the first shortest paths comprises:
determining, by the controller, a minimum bandwidth of respective bandwidths required for the first set of label switched path definitions; and
computing, by the controller, the first shortest paths to each satisfy the minimum bandwidth.

18. The method of claim 17, wherein a first one of the first shortest paths from the first common source to a destination of a first one of the first set of label switched path definitions does not satisfy the bandwidth required for the first one of the first set of label switched path definitions.

19. The method of claim 11, wherein computing the first shortest paths comprises:
initializing the CSPF algorithm; and
after initializing the CSPF algorithm, applying the CSPF algorithm to compute the first shortest paths of the network from the first common source to respective destinations of the first set of label switched path definitions without re-initializing the CSPF algorithm for any of the first set of label switched path definitions prior to an attempt to route the first set of label switched path definitions.

20. A non-transitory computer-readable medium comprising instructions for causing one or more programmable processors of a controller of a network, the controller comprising a multi-core computing platform having one or more computing cores, to:
obtain a plurality of label switched path definitions to be routed, each of the label switched path definitions specifying a source and a destination for a label switched path;
organize the plurality of label switched path definitions into sets of label switched path definitions by source, wherein a first set of the sets of label switched path definitions have a first common source, and wherein a second set of the sets of label switched path definitions have a second common source;
on a first core of the computing cores, execute one run of a constrained shortest path first (CSPF) algorithm to compute first shortest paths of the network from the first common source to respective destinations of the first set of label switched path definitions without re-initializing data structures of the CSPF algorithm;
at least partially in parallel with computation of the first shortest paths, on a second core of the computing cores, execute another run of the CSPF algorithm to compute second shortest paths of the network from the second common source to respective destinations of the second set of label switched path definitions without re-initializing data structures of the CSPF algorithm; and
provision at least one of the first shortest paths of the network in the network.

* * * * *